United States Patent [19]
Russell

[11] 3,950,984
[45] Apr. 20, 1976

[54] FORCE TRANSDUCER FOR STRAIN GAGE

[76] Inventor: John D. Russell, 26878 Sea Vista Drive, Malibu, Calif. 90265

[22] Filed: Sept. 27, 1974

[21] Appl. No.: 509,784

Related U.S. Application Data

[60] Division of Ser. No. 399,487, Sept. 21, 1973, abandoned, which is a continuation of Ser. No. 573,089, April 30, 1975.

[52] U.S. Cl. .................................. 73/88.5 R; 338/5
[51] Int. Cl.² .......................................... G01L 1/22
[58] Field of Search ................. 73/88.5 R; 338/2, 3, 338/5, 6, 47

[56] References Cited
UNITED STATES PATENTS

| | | | |
|---|---|---|---|
| 2,059,549 | 11/1936 | Carlson | 73/88.5 R X |
| 2,453,601 | 11/1948 | Statham et al. | 73/88.5 R X |
| 2,698,371 | 12/1954 | Li | 73/88.5 R X |
| 2,951,223 | 8/1960 | Li | 73/88.5 R X |
| 3,201,735 | 8/1965 | Brown et al. | 73/88.5 R X |

Primary Examiner—Charles A. Ruehl
Attorney, Agent, or Firm—Edward F. Connors

[57] ABSTRACT

Transducers of the resistance wire type are described, wherein strained resistance wires are adapted to function both as a sensor and load bearing member. These transducers comprise a pair of spaced apart load carrying or attaching devices which are connected by a plurality of lengths of resistance wire or filament, such as a coil, belt or rope of wire construction, in which the individual lengths of wire are mechanically parallel but are preferably connected in series electrically so as to form a continuous wire passing back and forth between and connecting the two load carrying or attaching elements. In a preferred embodiment, the ends of a length of wire rope, constructed of insulated wire, are held in, but insulated from, a pair of wire rope terminal fittings such as sockets; the individual lengths of wire of which the wire rope is composed are connected in series at their alternate ends, and suitable means such as lead wires are provided to connect the two ultimate ends of the serially connected wire in a conventional four-arm bridge circuit, whereby changes in the resistance of the wire which are induced by dimensional changes therein caused by forces applied to the terminal fittings may be measured.

4 Claims, 12 Drawing Figures

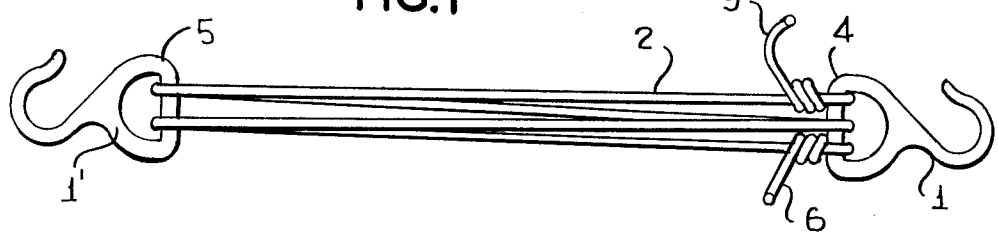
FIG. 1
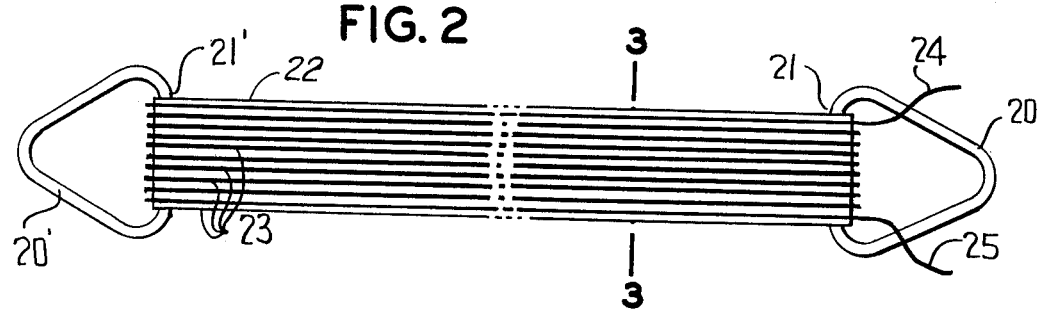
FIG. 2
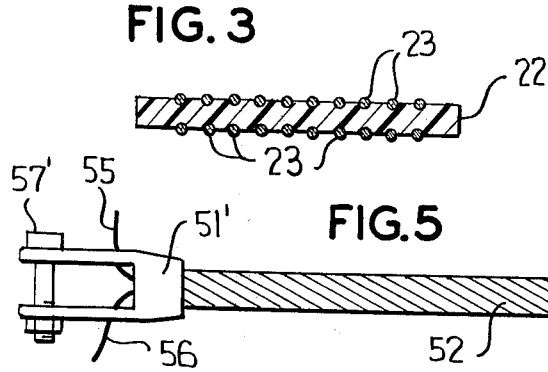
FIG. 3    FIG. 4
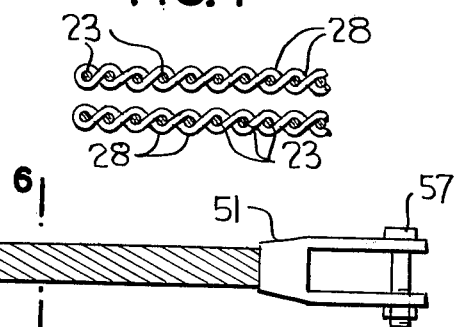
FIG. 5
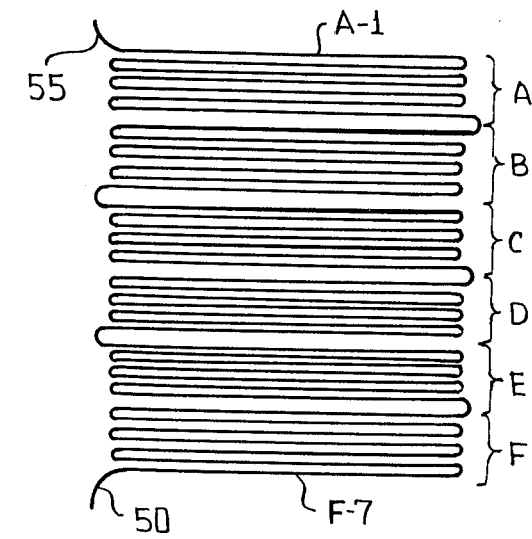
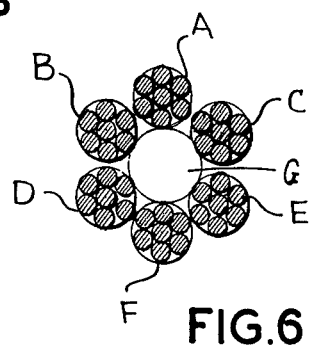
FIG. 6
FIG. 7

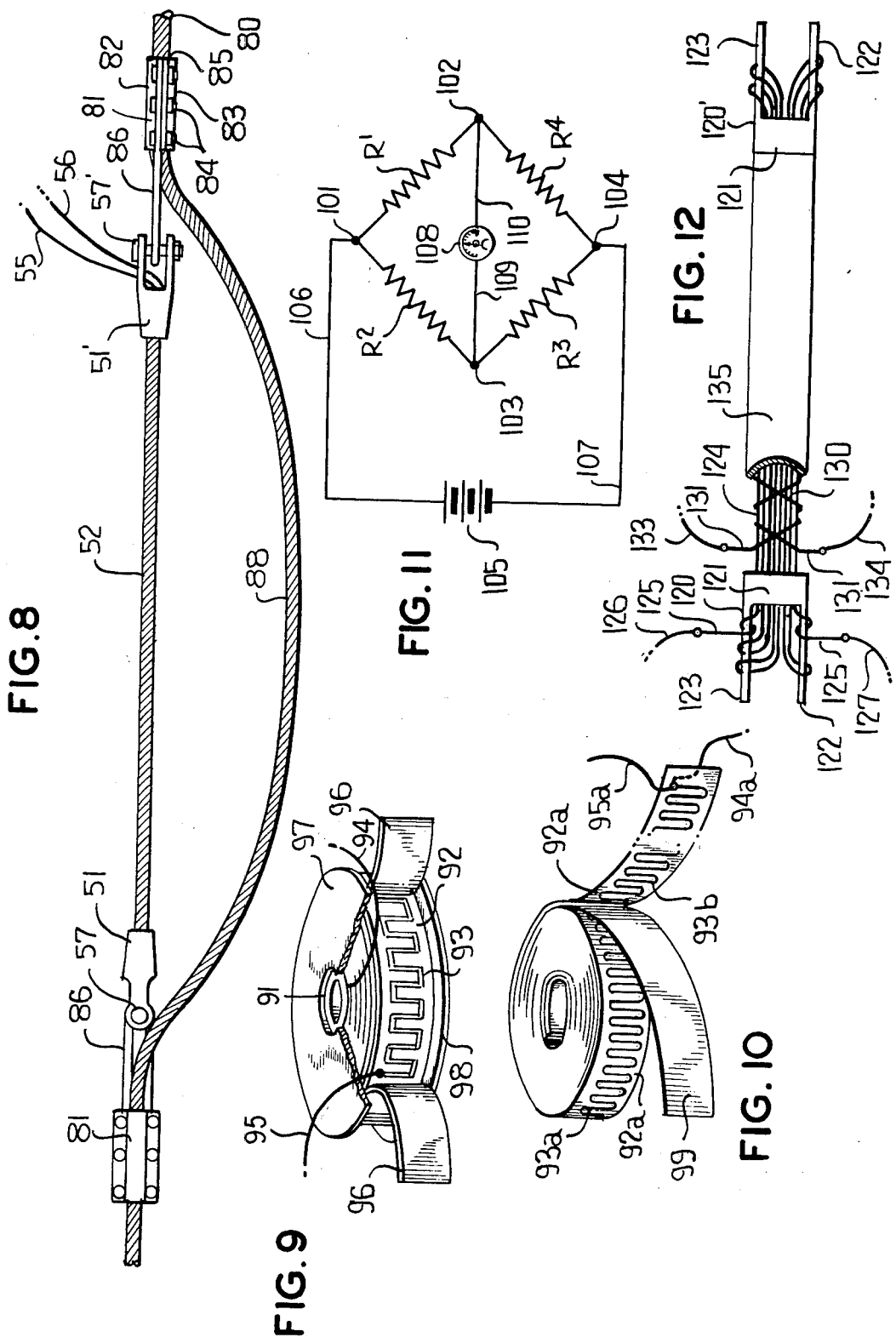

FORCE TRANSDUCER FOR STRAIN GAGE

BACKGROUND OF THE INVENTION

This is a divisional application of application Ser. No. 399,487, filed Sept. 21, 1973 now abandoned in favor of continuation application Ser. No. 573,089 filed Apr. 30, 1975.

FIELD OF THE INVENTION

This invention relates to improvements in resistance wire strain gage type transducers. More particularly, the invention is directed to an improvement in transducers of the resistance wire type in which the resistance element (which will normally be referred to as a "wire" or "filament" herein, since this is the usually preferred form of resistance element used) itself serves not only as a sensor to measure the strain, but is also a structural member or element so that the resistance wires are subjected to and support the entire load in the transducers.

Strain gages of the resistance wire or filament type have been used for some time in combination with various mechanical devices, such as, links, tubes, rings, etc., for measuring variable quantities, such as, strain, pressure, torque, acceleration, etc. The typical resistance wire strain gage type transducer contains a resistance wire or filament connected in a conventional four-arm bridge circuit, which, ordinarily, is balanced. The force to be measured is usually coupled mechanically to a link or ring or other device on which gages are bonded or attached by other means. The force exerted on the link introduces strains in the wire through the coupling means and causes the dimensions of the wire to be altered which results in a change in the resistance of the wire proportional to the load in the link. This, in turn, causes unbalancing of the bridge in an amount at least roughly proportional to the force applied to the link.

Except for certain units designed to measure very small loads (e.g., of the order of grams or ounces) most of the strain gages of the resistance wire or filament type which are now in use are not mechanically coupled directly to the force to be measured, and do not measure directly the total force. Instead, it is customary to mount a resistance wire type of strain gage on the surface of the test specimen or structural member in which it is desired to measure the strain imposed on that test specimen or structural member.

At the present time, two different methods are used principally for mounting the resistance wire or resistance element in most gages of this type. The first method is commonly referred to as the "bonded method." In accordance with this method, the resistance wire is bonded by means of cement, glue, or similar adherent to the surface of a sheet of an insulating material, usually paper, although plastic materials or plastic coated metal may be used. The ends of the wire are adapted to be connected, usually through lead wires, to form one arm of a conventional four-arm bridge circuit. The insulating material or paper is, in turn, adapted to be bonded by an adherent or welding to a test specimen in which strain is to be measured. Strain applied to the specimen is transmitted through the bonded paper or other supporting sheet material to the resistance wire, and the resulting change in the dimensions and resistance of the wire is indicated by the relative degree of unbalancing of the bridge circuit. Suitable calibration or tables provide means for measuring the amount of strain, force, pressure, or the variable which the device is designed to measure.

The second method for mounting a resistance wire for use in such gages is the so-called "unbonded method." In the unbonded method, the strain wire, that is, the resistance wire, is stretched around insulating supports, mounted on the test specimen and which are adapted to be made movable with respect to each other in response to a strain introduced into the test specimen to which the gage is attached.

In both of these methods, since the resistance wire does not support the total force applied to the test specimen, it is necessary to carefully position the resistance wire element on the test specimen in order to be sure that it is so positioned that it accurately reflects the total strain or force imposed on the test specimen. In many instances, it is necessary to use a plurality of resistance wire elements positioned at several points on the test specimen to be sure that the maximum force to which that test specimen is subjected is measured.

It is, also, well known that the power sensitivity of a Wheatstone bridge and most other circuits employed in the measurement of resistances is directly proportional to the magnitude of the current which can be carried by the resistance circuit being measured and the voltage which can be impressed on the circuit. In view of this, it is apparent that the sensitivity of measurement of strain by means of a resistance wire type of strain gage is directly proportional to the current which can be passed through the strain sensitive element of the gage and the voltage. These, in turn, are proportional to a combination of the size or diameter of wire of filament used in the strain sensitive element and the length of wire. It is also proportional to the permissible operating temperature and the effective heat dissipating capacity of the gage element as a whole when attached in readiness for use to the member or test specimen to be stressed.

In most of the strain sensitive elements employed in the strain gages used in both the bonded and unbonded methods referred to above, the resistance wire or filament is of extremely small diameter and, thus, the current carrying capacity of such strain sensitive element has been so limited as frequently to require the employment of some method of amplification in conjunction with the Wheatstone bridge circuit in order to attain the requisite high sensitivity of the strain measurement and power to drive a meter. It has also resulted in the strain sensitive element being rather fragile or delicate and thus readily damaged or destroyed in use or handling. In addition, the direct force bearing capability is minute.

It is, accordingly, an object of this invention to provide an improved strain gage of the resistance wire type which is of particularly rugged and sturdy construction and which, if desired, can be subjected to the entire force to be measured, and function both as the load bearing element and sensor.

It is a further object of this invention to provide an improved transducer of the resistance wire type having increased current carrying capacity and power sensitivity over those hertofore employed. Some models can be used to operate standard meters, relays and other devices with no amplification.

A further object is to provide a strain gage having good heat dissipating qualities.

A further object is to provide an improved transducer of sturdy and simple construction.

Other and further objects of the invention will be apparent as the present description progresses.

In brief, the strain gage of the present invention comprises two spaced apart load carrying or attaching devices which are connected by a plurality of parallel resistance wires. While the resistance wires connecting the two load carrying or load attaching elements are mechanically parallel and closely grouped or packed, they preferably are in series electrically so as to form a continuous length of resistance wire passing back and forth between the two load attaching or carrying elements.

The details of the present invention will be apparent to those skilled in the art from a consideration of the accompanying drawings which illustrate preferred embodiments of the invention, and the description thereof which follows.

In the drawings:

FIG. 1 is a perspective view of a simplified form of the strain gage of the present invention in which two load attaching or carrying elements are connected by a coil of resistance wire.

FIG. 2 is a perspective view of a modified form of strain gage illustrated in FIG. 1.

FIG. 3 is a cross-section taken on the line 3—3 of FIG. 2.

FIG. 4 is a cross-section similar to FIG. 3 of a modified form of strain gage.

FIG. 5 is a perspective view of a form of strain gage of the present invention in which the resistance wires connecting the two load attaching or carrying members or elements are in the form of a wire rope.

FIG. 6 is a cross-section taken on the line 6—6 of FIG. 5.

FIG. 7 is a diagrammatic representation illustrating the mechanically parallel relationship of the wire forming the wire rope of FIGS. 5 and 6 and their connection electrically in series so as to constitute a single elongated resistance wire.

FIG. 8 is a perspective view showing strain gage of the present invention attached to a bight in a cable in order to measure the tension applied to the cable;

FIG. 9 is a perspective view, partially in section, of a form of strain gage of the present invention adapted for measuring compressive forces; and FIG. 10 is a perspective view of a modified form of strain gage for measuring compressive forces, in which both leads are at the outer periphery of the unit.

FIG. 11 is a wiring diagram for a circuit including a strain gage of the present invention and an indicating instrument.

FIG. 12 is a perspective view, partly cutaway, of a form of device in which a longitudinal coil of resistance wire (such as the coils illustrated in FIGS. 1 through 5 above) has wrapped around it a second, circumferential coil of resistance wire.

Considering now the form of strain gage illustrated in FIG. 1 of the drawings, the load carrying or attaching devices comprise a pair of hooks 1 and 1' having D-shaped eyes.

The two hooks 1 and 1' are connected mechanically by the coil of resistance wire 2. One end, 3, of the resistance wire 2 is suitably attached to the eye of hook 1 as by being wrapped around the bar 4 of the eye and then wrapped around itself as illustrated in the drawings. Other forms of load attaching or carrying elements and other forms of attachment thereto can, of course, be employed. The wire then runs from hook 1 over the bar 5 of hook 1', returns to and over bar 4 of hook 1, extends back to hook 1', where it passes over bar 5, and returns to bar 4 of hook 1, passing around it and being secured thereto by several wrappings around itself. In effect, therefore, the hooks 1 and 1' are connected together mechanically by a coil of resistance wire. As illustrated in the FIG. 1, the coil comprises two loops of wire but, obviously, a single loop of wire or more than two loops may be employed to connect the hooks 1 and 1'. The resistance wire 2 which forms the coil connecting the two hooks, is preferably an insulated wire so that, in effect, the hooks 1 and 1' are connected mechanically by a number of parallel lengths of resistance wire which are connected in series electriclly. The ends 3 and 6 of the resistance wire 2 in use would be attached to lead wires.

An alternative form of strain gage of the present invention in which the load carrying or load attaching devices are connected mechanically by coil of resistance wire is illustrated in FIG. 2. As illustrated in FIG. 2, the load carrying or attaching devices comprises a pair of D-shaped rings 20 and 20'. The bar portions 21 and 21' of these D-rings are connected by a strap of belt 22 around which is wound a coil of resistance wire 23—illustrated in FIG. 2 as composed of 10 loops. The ends 24 and 25 of resistance wire 23 are adapted to be attached in use to lead wires. The wire 23 is preferably insulated and is supported by belt of loop 22 composed of stretchable or elastic material, such as, a fibrous belt, leather, rubber, or plastic. As illustrated in cross-section in FIG. 3, the wire 23 may be partially or wholly imbedded in the belt or loop 22, which is also preferably of a material having good dielectric properties so as to aid in insulating the wire from the rings 20 and 20' and any other objects with which it may come in contact during use.

An alternative form of construction in which the coil of resistance wire connecting D-rings 20 and 20' is in the form of a woven belt is illustrated in cross-section in FIG. 4. As there illustrated, the resistance wire 23 of the coil constitutes, also, the warp filaments of the belt and the warp filaments are prevented from becoming entangled by interwoven woof threads or filaments 28 preferably made of a suitable insulating material, such as, textile or plastic fibers or filaments.

A preferred form of strain gage of the present invention, particularly suitable for use where tensile stresses of considerable magnitude are to be measured, is illustrated in FIG. 5. As there illustrated, the load carrying or attaching devices comprise a pair of open sockets 51 and 51' connected by a wire rope 52 made of resistance wire or filament.

Conventional wire rope is made of a varying number of wires to the strand and a varying number of strands to the rope, and any normal wire rope construction may be employed for the resistance wire, or strain-measuring element, of the form of strain gage illustrated in FIG. 5. Some typical wire rope constructions comprise single strands of seven, 19, 37, or 61 wires to the strand and multi-strand ropes, such as, ropes having six strands with a hemp or other fibrous center or seven strands, each of the strands having seven, 19, 37, or 61 wires. The regular lay of wire rope comprises wires in the strands laid to the left, the strands being laid to the right in the rope, this is known as right-lay rope; or wires laid to the right, the strands being laid to the left, which is known as left-lay rope. Lang lay rope is also produced commercially in which the wires in the strands and the strands themselves are laid in the rope in the same direction, either right or left. While Lang lay rope is somewhat more flexible than regular lay wire rope, it does untwist more readily and care must be exercised in its use, so that it is usually not considered as good an all-around rope as regular lay rope.

A typical wire rope construction for the resistance wire rope 52 of the form illustrated in FIG. 5 is shown in cross-section in FIG. 6 in which six strands A, B, C, D, E, and F of seven wires each are laid around a four-strand hemp core G. It will be understood, of course, that FIG. 6 is given purely for the purpose of illustration and that other conventional or special wire rope construction may be employed.

In FIG. 7 there is illustrated diagrammatically the connection of the wires in the strands in series with the strands also being connected in series. As there illustrated, the seven wires composing each of the strands, such as, wires A-1, A-2, A-3, A-4, A-5, A-6, and A-7 of strand A, are connected in series so that each strand, in effect, comprises a single length of wire and each of the strands A, B, C, D, E, and F are connected in series so that all forty-two wires in the six strands of wire rope 52 comprise a single length of wire.

It will be obvious that the rope 52 may be a relatively short section of wire rope of a conventional construction with the wires in each strand being connected at their ends to each other in series as by twisting and soldering, or by other suitable electrical connections, and the ends of the wire in each strand being connected in series to the end F of the wire of adjacent strands by suitable electrical connections. Alternatively, of course, a seven-wire coil may be twisted into a strand so that the strand is actually composed of a single wire and the ends of this wire be connected in series to the ends of the wire in an adjacent strand.

In order for the individual wires forming the wire rope 52 to be connected electrically in a series it is, of course, necessary to employ insulated wire in construction of the wire rope 52. Lead wires 55 and 56 are connected to the ends of the wire in the rope 52.

It will also be apparent that, instead of all of the strands being connected in series, only certain of the strands may be connected in series or only certain of the wires in each strand may be connected in series and function as the strand measuring element. However, since the maximum length of wire is obviously obtained when all of the strands in the rope and all of the wires in each strand are connected in series, and thus the greatest voltage can be applied to give optimum sensitivity to strain in the wire rope 52, it is preferred that essentially all of the individual wires forming each strand and individual strands be connected in series. While the leads 55 and 56 are shown as coming from the one end, that of socket 51' in the drawings, it will be obvious that, if desired, the leads may be taken at opposite ends of the rope 52; depending on the number of wires in the strands and the number of strands in the rope in order to have both leads at one end or at opposite ends, it may be necessary for a single wire of the rope not to be connected in series.

The wire rope can be secured to the fittings, that is, the open sockets 51 and 51' in a manner analogous to that employed for fastening wire rope in its fittings, that is, by seizing the rope at the end before cutting off and, also, at a distance equal to the length of the socket basket from the end. The first seizing is removed after the rope is cut off, the ends of the wires broomed out straight and connected in series and then held in the socket basket by means analogous to those employed for holding wire ropes in the socket, that is, by conical shaped wedges, by filling the socket with a low melting alloy (care being exercised that the molten alloy does not destroy the insulation) or by filling the socket with the wire ends therein with a rigid plastic material, etc. One preferred clamping method involves filling the socket with a powder reinforced epoxy resin and follow up swaging after a cure or partial cure of the epoxy.

It will be obvious, of course, that other types of load attaching elements, than those specifically illustrated in the drawings, and other means for attaching the coil of resistance wire thereto, may be employed if desired. Thus, in FIGS. 1 and 2, the D-shaped rings could be replaced by a shackle and pin, while in place of open sockets illustrated in FIG. 5, there could be used either other types of fittings conventionally used as wire rope fittings, such as closed sockets or even a thimble with the wire rope wrapped around it and its ends clamped to the length of the rope or specially designed fittings. It is of course not essential that the resistance wire itself be directly secured to the fitting; for example, a loop of suitable material could be passed through the loop at the end of each length of resistance wire in the coil or at the end of a group of wires (such as the loop at the end of each strand of a wire rope constructed of a single length of resistance wire) and then the ends of this loop of suitable material could be secured in or to the fitting. Since in such a construction the insulated resistance wire would not be itself directly attached to the fitting, it would not be necessary to use the same degree of care not to injure the insulation on the resistance wire when the fitting was attached. Such loops of material to attach the resistance wires to the fittings could be made of non-conductive material such as nylon filament or spun plastic, glass or textile fibers or filaments, in the case of transducers designed for measuring relatively light loads at ordinary temperatures, or could be wire or wire rope, which preferably would be insulated at any point where it contacted the resistance wire in the case of units designed for measuring loads of substantial magnitude and/or for use at elevated temperatures.

While theoretically the resistance wire employed in the strain gages of the present invention could be any conductive metal, it is preferred to employ wires made of an alloy customarily used in making resistance wires. Wires made of such alloys as Nichrome, Copel, Constantin, and Advance are known and can be employed if desired. I particularly prefer "Evenohm" (trademark, approximately 80 percent nickel, 20 percent chromium) resistance wire, since this is commercially available and has tensile strength approximating that of the best steel alloy wires of similar diameter or gage. Of course, materials chosen for desired mechanical or other properties (e.g., high tensile strength, low hysteresis, corrosion resistance, etc.) could be used even with relatively lower specific resistances. Thus, in larger units in which there is a substantial overall length of wire, it would be feasible and, in fact, might be preferred to employ wire made of low resistance steel (or other metal or alloy) but having optimum mechanical properties.

While it is preferred, as stated, that the wires be connected in series, it is possible (particularly in devices employing a relatively long, small cable, such as, the wire rope 52 in the device of the type illustrated in FIG. 5) to employ a wire rope or cable in which the wires are parallel electrical form as well as parallel mechanical form. In this case, of course, it is not necessary that the individual wires be insulated, although an outer insulating coating over the cable would be desirable. It would also be possible, of course, to employ a cable (say a seven-wire, single strand cable or wire rope) in place of a single resistance wire 2 in a device of the type illustrated in FIG. 1, so that the wires of the cable were in the parallel electrical form as well as parallel mechanical form. However, since, as illustrated, there would be four effective lengths of cable in the device illustrated in FIG. 1, should this be done, some advantage of series electrical form would be obtained, although the full benefit thereof when the wires of the rope or cable are also in series form must be missing.

A primary reason for the preference that the resistance wires comprising the strain measuring element and principal load bearing element of the present force transducers be connected in series electrically is that, by doing so, the maximum resistance is obtained. High resistance minimizes detrimental effects of lead wire and contact resistances and permits moderately high voltages (10 to 50 V) low current systems which are generally preferred.

For example, in the construction illustrated in FIG. 1, there being four lengths of wire 2, if we assume 25 ohms per length, then a series electrical arrangement would provide a 100 ohm bridge arm and the effects of resistance of terminal connections and lead wires would be reduced compared with a parallel electrical arrangement wherein the resistance would be only 6¼ ohms. In the latter case, larger and more cumbersome low resistance lead wires would be required to keep this inactive resistance low so as not to reduce sensitivity. In addition, most sensing instruments are voltage sensing and more resistance permits more bridge voltage and, consequently, more change in voltage with a given per unit resistance change.

Thus, in the device illustrated in FIG. 2, the series and parallel connections provide resistances which differ by 400 to 1. In general, the series resistance is $n^2$ times the parallel resistance ($n$ being the number of lengths of wire). In FIG. 2, assuming 25 ohms/length, we have 500 ohms for the series arrangement and 1.25 ohms for the parallel arrangement. The advantage in applied voltage, however, is only $n$ times. Assuming 100 ma/wire allowable (1/10 amp), we could apply 50 volts to the 500 ohms series unit to get 1/10 amp flowing in the long series wire and 2½ volts to the parallel arrangement where a two ampere current (20 times 1/10 amp) could be used, (20 1/10 amp currents in parallel). For the same load in the transducer, the bridge voltage output for the series unit would be twenty times that of the parallel unit.

In some cases, as in a system involving direct drive of a meter or relay (no amplifier), it is advantageous to make the bridge resistance and the meter or relay resistance approximately equal. Resistances might be typically 100 ohms to 2,000 or more ohms. In some cases, it would be advantageous to have two or more coils connected in series electrically and then paralleled with each other. For example, 10 of the 20 wires of FIG. 2 could be series connected to provide a 250 ohm coil. The other ten could be identically connected to give a second 250 ohm coil and then the two 250 ohm coils paralleled to give a resistance of 125 ohms. Thus, a wide variety of series parallel combinations are possible.

Where meters or relays are to be driven directly, power transfer is important, and here impedance matching can be accomplished readily in this transducer. In addition, these units provide improved power dissipation compared with the usual bonded strain gage, and thus provide more power sensitivity for direct driving of meters, etc., where desired.

The material employed for insulating the wires when they are in the series electrical form may be any suitable insulating material having acceptable dielectric and mechanical properties. If the device is to be used at ambient temperatures, then the insulation can advantageously be rubber, plastic, or lacquer forms of insulation with good resistance to the mechanical pressures developed. If the device is intended for use at more elevated temperatures or at extremely low temperatures, then the material employed as insulation must, of course, be selected with due regard for the temperature of which the device is designed to be used. Highly fluorinated hydrocarbon polymers, such as, polytetrofluoroethylene, are satisfactory at relatively high temperatures, but at extremely high temperatures it may be necessary to employ mineral insulation, such as, asbestos fiber or paper wrappings, or glass or other ceramic type of paper or fabric wrapping or packing around the individual wires.

It will, of course, be obvious that the entire exterior of the coil of resistance wire may be protected by a coating or layer of insulation or other protective covering or armor to protect the resistance wire and the insulation on the individual lengths of resistance wire. Thus, such a protective covering could be in the form of a tubular or a woven or wrapped covering of textile or other fibrous material or of wire or metal tape or tube, which was applied either directly over the insulated resistance wire or over a plastic or other non-conductive coating or covering thereon.

The forms of transducers of the present invention thus far described are, as is readily apparent, particularly adaptable for measuring tensile stresses and are of quite rugged and simple construction suitable for a wide variety of force measuring applications, some of the more readily apparent applications for which these devices are particularly adapted would be in pull tests, measuring the tensile stresses in all forms of cables, such as, control cables, tow cables, cables used in derricks and cranes (such as those employed in construction), stresses in bridges, and they might, if desired, be employed as a form of scale or a weight measuring device.

In such applications the transducer of the present invention can be inserted as a part of the mechanical linkage in the structure in which it is desired to measure the force. For example, it can be attached to the end (or between ends as a link) of a control cable or tow cable or cable in a derrick or crane and function both as a transducer or force transmitting device and also a strain gage. In such applications it can be subjected to and used to measure the entire force imposed on the element with which it is mechanically linked.

One form of mechanically linking the strain gage of the present invention to a cable in which it is desired to measure the tensile strain is illustrated in FIG. 8. As there illustrated, a strain gage of the type illustrated in FIG. 5 of the drawings is attached to a cable 80 so as to measure the tension to which cable 80 is being subjected in use.

As illustrated in FIG. 8, two clamps 81 and 81' are attached to the cable 80 by bolting together the two semi-cylindrical portions 82 and 83 of the clamps by bolts 84 extending through longitudinal exterior flanges 85 thereon. Each of the flanges 85 has a U-shaped extension 86 through which the shackle bolt 57 of the open socket end fittings 51 and 51' of the transducer is attached. The clamps 81 and 81' are spaced a slightly greater distance apart on cable 80 than the length of the strain gage so that when the shackle bolts 57 of open sockets 51 and 51' of the strain gage are attached to U-shaped extensions 86 of the clamps, a small bight or loop, illustrated as 88, is formed in cable 80. Thus, when cable 80 is subjected to tension, the entire force is transmitted to the transducer. The electrical leads 55 and 56 from the transducer are connected to a balanced bridge as more fully described below.

Thus, as the cable 80 is subjected to tension, the entire force is borne by the strain gage and can readily be measured by conventional electrical means.

A suitable Wheatstone bridge type of circuit into which the strain gage may be connected by means of its electrical leads, is illustrated diagrammatically in FIG. 11. As there illustrated, the electrical leads 55 and 56 from the strain gage are connected to terminals 101 and 102 respectively of the bridge, thus, the strain gage and its lead wires constitutes resistance $R^1$ of the bridge circuit. Resistance $R^2$, connected to terminals 101 and 103 of the bridge, may be a matching dummy strain gage connected by balancing lengths of lead wires to terminals 101 and 103. Resistances $R^3$ and $R^4$ may be matching equal fixed resistances connected respectively to terminals 103 and 104 in the case of resistance $R^3$ and 102 and 104 in the case of resistance $R^4$. Thus, in use when the strain gage is not being subjected to any strain and is at rest, the circuit is balanced and, when current is supplied to terminals 101 and 104 through wires 106 and 107, respectively, from a suitable source of electrical energy, illustrated as battery 105, the bridge circuit is balanced and no current will flow between terminals 102 and 103 through wires 110, 109, and electrical indicating device 108, which may be a galvonometer or equivalent instrument. As tension is applied to the strain gage, for example, when cable 80 is subjected to tension, which is transmitted to the strain gage illustrated therein, the resistance wires constituting the wire rope pressure sensitive element 52 of the strain gage illustrated in FIG. 5 will increase in length and decrease in diameter as greater tension is imposed thereon. Thus, the resistance of these wires will increase proportional to the force imposed thereon, and since the strain gage constitutes resistance $R^1$ of the bridge, the bridge will be unbalanced. This will cause current to flow between terminals 102 and 103 and be reflected in the readings of the galvonometer, or equivalent instrument 108. The galvonometer, or equivalent instrument 108, may be graduated directly in terms of load or may be employed in conjunction with an appropriate table of values, but, in either case, its readings will be readily and accurately observable and will be proportional to changes in the resistance $R^1$, that is, caused by changes in the force applied to the strain gage in use. A preferred form of electrical instrument 108 for use in the above circuit is the SR-4 (a trade name) strain indicator manufactured by the Baldwin Lima-Hamilton Corporation.

Strain gages adapted to measure compression forces, as well as those to measure tensile forces, are also encompassed within the scope of the present invention. A convenient form of strain form of the present invention adapted to measure compression forces is illustrated in FIG. 9. As with the previously described tension measuring strain gages, the compression measuring strain gages of the present invention are also adapted to be subjected to and bear the full load or force to be measured.

As illustrated in FIG. 9, the strain gage is in the general form of a washer (or post) composed of a central relatively light metallic tube 91 around which is wrapped a coil of paper or other suitable tape 92 to one side of which is fastened a continuous length of resistance element 93 having a zig-zag configuration so that the apexes of the resistance element 93 approach the edges of the paper or other tape 92. As illustrated in FIG. 9 of the drawings, the resistance element can be in the form of an etched or cut-out ribbon or tape of a thin metal foil; e.g., an "Evanohm" foil having a thickness of say 0.001 to 0.005 inches, which preferably has been coated with insulation after etching or cutting out. However, the resistance element obviously may take other forms and, if desired, the tape 92 could be omitted and the insulated resistance element 93 wound on itself. Lead wires 94 and 95 are attached to opposite ends of the resistance element or "wire" 93 and extend from the strain gage in order to attach it to a suitable bridge circuit for measuring the forces applied to the gage. The exerior of the coil of paper or other supporting tape 92 having the resistance wire 93 cemented or otherwise suitably fastened to or embedded therein, may be supplied with an insulating cover or tape shown as 96 in the drawings. The ends of the coil may be protected by load distribution washers 97 and 98, which may be of metal or other suitable material adapted to rest on and protect the edges of the coil of tape 92 which constitutes the ends of the strain gage.

As the strain gage, of FIG. 9, is subjected to a compressive force applied to opposite ends thereof, that is, to washers 97 and 98, it will be apparent that the tape 92 will be compressed and the resistance wire 93 attached thereto will, likewise, be compressed, thus, shortening the resistance wire and, also, slightly increasing its diameter so as to change the electrical resistance of the gage. While there may be only slight compression of the tape 92, or any single length of wire therein, it will be apparent that the overall length of resistance wire 93, since it has a zig-zag configuration, will be quite substantially shortened and, thus, a change in resistance thereof due to the compression forces applied to the gage will be sufficiently great to be readily and accurately measured.

This form of resistance gage may also be employed in the manner described above by connecting the lead wires 94 and 95 thereof to terminals 101 and 102 of the bridge circuit illustrated in FIG. 11 so that the strain gage and its lead wires becomes resistance $R^1$ of the bridge circuit. As compression forces are applied to washers 97 and 98, the resistance wire 93 is compressed and thus shortened and its diameter increased, thus lowering its resistance, and unbalancing the circuit. This is reflected on instrument 108 and is proportional to the compressive force to which the strain gage is subjected.

While in the form of construction illustrated in FIG. 9, one of the leads 94 is near the center of the gage and the other lead 95 is at the outer periphery of the gage; it would, of course, be feasible to modify the construction of the gage so that both leads would be at the outer periphery thereof (or at the center thereof if desired). One such form of construction is illustrated diagrammatically in FIG. 10. As there illustrated, an insulating tape, e.g., paper, having a resistance wire 93a attached in zig-zag fashion to one of its sides and a resistance wire 93b attached in zig-zag fashion to its other side is wound into a coil. While the resistance wires 93a and 93b are preferably insulated, as by enamel, further insulation may be provided by a second insulating tape 99 wound into the coil. Prior to winding the coil, the ends of wires 93a and 93b are connected at the center of the coil. The leads 94a and 95a can be connected to the ends of wires 93a and 93b respectively at the outer periphery of the coil.

It will be apparent that the strain gages of the present invention should be designed in accordance with the particular use to be made of them and with a view to the magnitude of the forces to be measured in use. It will also be apparent that they may be temporarily attached in a structure and used for test or evaluation purposes or may form a permanent structural part of a particular structure in which they are used. In addition to functioning as strain gages to measure the forces to which they are subjected, they may also serve a dual function of an automatic safety device. By inserting a fail safe alarm device in the circuit in which the strain gage is employed, if a single wire length of the gage should break, current will automatically cease to flow through the gage and can trigger an alarm. Wire ropes and cables, unless suddenly extremely overloaded, very seldom are subject to sudden break but normally there is failure of one or more wires, which, if detected, gives a warning of overloading of the wire rope or cable. Since most or all of the wires forming the coil or wire rope of the pressure sensitive element of the present strain gages are connected in series, the strain gages of the present invention offer a convenient alarm triggering element for detecting overload. By making the resistance wire rope or coil employed in a strain gage of the present invention as the weak link in a given system, this feature of an automatic safety alarm triggering device can be accented.

In the transducer illustrated in FIG. 12, there are two resistance elements. As illustrated, the end fittings 120 and 120' are open socket type fittings, each having a tubular basket portion 121 and jaws 122 and 123. A longitudinal coil 124 is formed by anchoring one end of resistance wire 125 to end fitting 120 by wrapping it around jaw 123 thereof, wire 125 is then led through the basket portion of fitting 120 and down to and through the basket portion of fitting 120' and looped over one of the jaws, 123, thereof. It is returned through the basket portion of fitting 120' back through the basket portion of fitting 120 and looped over jaw 123 thereof. Construction is continued in this manner until the desired length of resistance wire 125 is attained in longitudinal coil 124, about half of the loops of resistance wire 125 at the ends of longitudinal coil 124 being attached to the end fittings by being looped over jaw 123 and the other half of the loops being looped over the other jaw, 122, of the end fitting. The other end of resistance wire 125 is secured to jaw 122 of end fitting 120 by being wrapped around this jaw, this type of construction has the advantage that there is positive interconnection of the resistance wire 125 with the end fittings 120 and 120'. Leads 126 and 127 are attached to the ends of resistance wire 125. After longitudinal coil 124 has been completed, a circumferential coil 130 is constructed by wrapping resistance wire 131 around longitudinal coil 124. In order that all leads will be at one end of the transducer, it is preferred that resistance wire be wrapped around longitudinal coil 124 from near end fitting 120 to near end fitting 120' and that a return wrapping then be made to end fitting 120. Leads 133 and 134 are attached to the ends of resistance wire 131. A protective coating, or covering, 135 may then be applied over longitudinal coil 124 and circumferential 130.

In use, longitudinal coil 124 of the transducer illustrated in FIG. 12 could be connected as resistance $R^1$, of the bridge circuit illustrated in FIG. 11, by connecting leads 126 and 127 to terminals 101 and 102, respectively; circumferential coil 130 could be connected as resistance $R^4$ by connecting leads 133 and 134 therefrom to terminals 102 and 104, respectively. As a load (pull) is applied to end fittings 120 and 120', the longitudinal coil 124 is subjected to tension and functions as previously described. Circumferential coil 130 carries no significant load but does provide temperature compensation and reduces the problem of providing dummy resistors to complete the bridge circuit.

A single transducer unit, in which all of the resistors needed to complete a bridge circuit are incorporated, could be constructed by forming two separate and independent longitudinal coils connecting the end fittings of the transducer. Such longitudinal coils would constitute the "active" coils, subject to load, of the transducer; two separate and independent circumferential coils could then be wrapped around the longitudinal coils. One of the longitudinal coils could be connected as resistance $R^1$ of the bridge circuit illustrated in FIG. 11, and the other longitudinal coil connected as resistance $R^3$. One of the circumferential coils would be connected as resistance $R^4$ and the other circumferential coil as resistance $R^2$. In this manner as load (pull) is applied to the end fittings of the unit, the load is borne by the longitudinal coils and the resistance in both of the longitudinal coils will increase due to the increase in tension load thereon. Since the circumferential coils are not subjected to any significant tension load, there will be no significant change in their resistance due to the force applied to the end fittings of the unit. Due to the increase in resistance in the longitudinal coils, connected as resistance $R^1$ and $R^3$ of the bridge circuit, the voltage at terminal 102 will go down, and that at terminal 103 will go up, thus the bridge will be unbalanced.

What is claimed is:

1. A resistance type strain gage which comprises a pair of spaced apart load attaching elements, each of said load attaching elements having means for detachably connecting the same to a load, a plurality of insulated self-supporting conductive resistance elements mechanically connecting said load attaching elements, said resistance elements being insulated from said load attaching elements and from each other and being conductively connected at their alternate ends in series and means for connecting the ends of said serially connected resistance elements to an electric circuit, said resistance elements connecting said load attaching elements forming a first coil of resistance wire, a second independent coil of resistance wire mounted on said first coil of resistance wire connecting said spaced apart load attaching elements in such manner as to be free of any load applied to said first coil when said load attaching elements are connected to a load, and means for attaching the ends of the wire of said second coil to said electric circuit.

2. A strain gage as defined in claim 1 wherein said second coil is mounted on said first coil of resistance wire connecting said spaced apart load attaching elements by winding the same circumferentially about said first coil.

3. A strain gage as defined in claim 1 wherein the resistance elements are intimately grouped with each other.

4. A strain gage as claimed in claim 1 wherein a protective cover encases the coils.

* * * * *